Inventor
Paul L. Kline

Feb. 12, 1952     P. L. KLINE     2,585,252
APPARATUS FOR PERFORATING DISTORTABLE MATERIAL
Filed May 31, 1946     2 SHEETS—SHEET 2
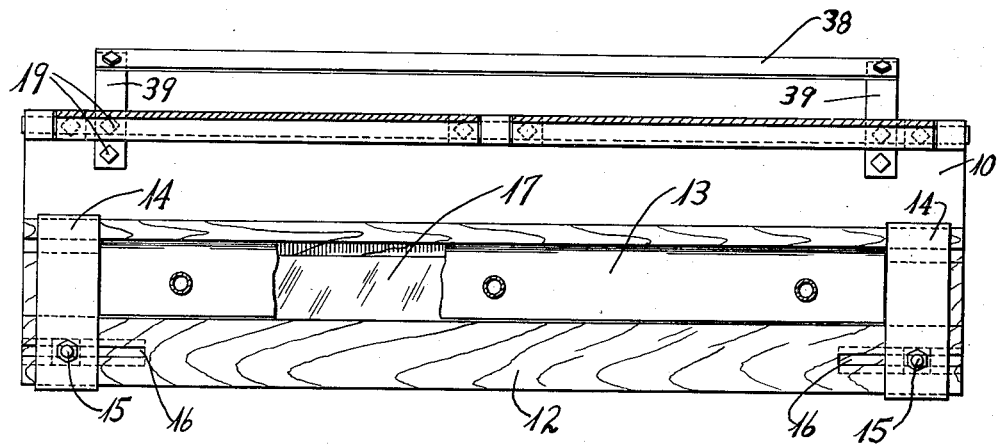
Fig-3
Fig-4
Fig-5
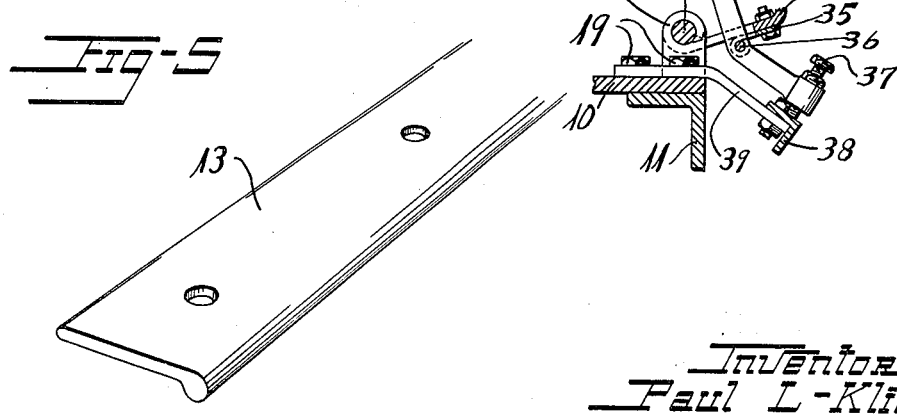
Inventor
Paul L. Kline
By
Att'y Patented Feb. 12, 1952

2,585,252

UNITED STATES PATENT OFFICE 2,585,252

APPARATUS FOR PERFORATING DISTORTABLE MATERIAL

Paul L. Kline, Akron, Ohio, assignor to The B. F. Goodrich Company, New York, N. Y., a corporation of New York Application May 31, 1946, Serial No. 673,401

2 Claims. (Cl. 164—86)

1

This invention relates to apparatus for perforating pieces of stretchable and highly distortable material such as rubber, synthetic rubber, plasticized polyvinyl chloride and other vinyl resins at a plurality of spaced-apart positions along each piece. The apparatus is particularly useful in the manufacture of gaskets for refrigerators, washing machines, automobiles and other allied products where it is desired to perforate the material and maintain a constant dimensional relationship between the perforations to facilitate alignment of the material with other members.

Objects of the invention are to provide apparatus for perforating pieces of highly distortable material at a plurality of determinately spaced-apart positions along the same, to provide clean perforation, to provide effectively for the removal of slugs, to provide for convenience and economy of operation and to provide for simplicity of construction.

These and other objects will appear from the following description and the accompanying drawings.

In the drawings:

Fig. 3 is a plan view of the supporting structure taken along the line 3—3 of Fig. 1, parts being broken away.

Fig. 4 is an elevation of the slug-ejecting apparatus shown in Fig. 2.

Fig. 5 is a perspective view of a piece of the material after perforation.

Figure 1:
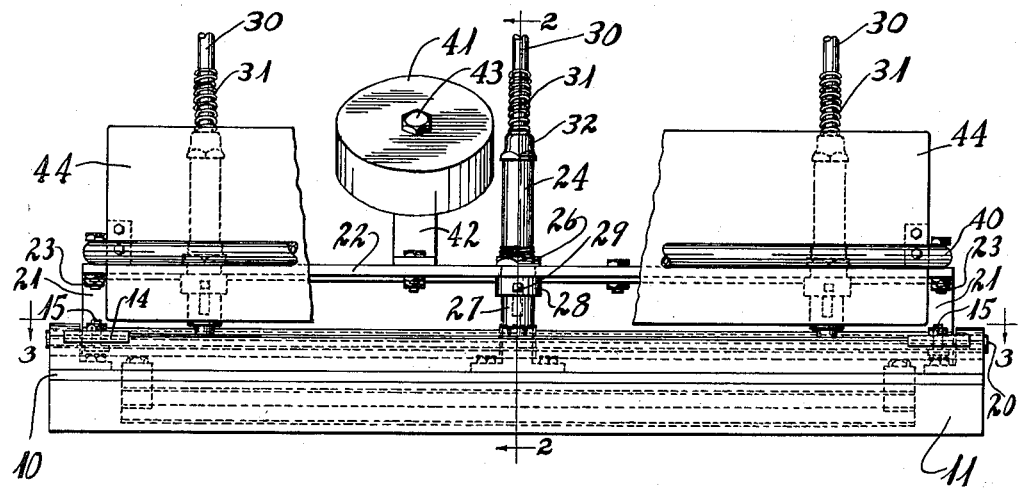
Fig. 1 is a front elevation of apparatus constructed in accordance with and embodying the invention, parts being broken away.

In the embodiment of the invention illustrated in the accompanying drawings a support or base 10 is mounted on angle members 11. Mounted on the base 10 is a formed rest 12 with the supporting surface conforming substantially to a face of a piece of material 13. To aid in placing the material 13 at a determinate position on the rest 12, guides 14 are adjustably secured to the rest 12 by bolts 15 slidably mounted in slots 16 in the rest 12. A cushion or backing pad 17 is mounted on the supporting surface of the rest 12 to facilitate the clean perforation of the material 13 and the removal of the slugs from the material 13.

Hinged to the base 10 is a structure 22. The hinge elements comprise fixed hinge brackets 18, 18 mounted on the base 10 by bolts 19, 19, movable hinge brackets 21, 21 mounted on the structure 22 by bolts 23, 23, and rotating on hinge-pins 20 inserted in the brackets 18 and 21. Die mounts 24 of perforating elements are mounted in determinately spaced-apart apertures 25 in the structure 22 and clamped to the structure 22 by nuts 26 turning on threaded sections of the mounts 24. Each mount 24 has an electrically-heated, slotted, tubular die 27 open at the penetrating edge and telescopically mounted in a flanged collar 28 of the mount 24. A set screw 29 is mounted in the collar 28 to hold the die 27 in a fixed position. Connected to a die heating element in the mount 24 is an electrical conduit 30. A helical wire support 31 is wrapped on the conduit 30 and mounted on the holder 24 by a threaded collar 32.

To eject the slugs resulting from the perforating operation a plunger 33 is inserted slidably in the die 27 and an arm 34, one end of which moves in a slot in the die 27, is mounted for swinging movement on the movable hinge bracket 21. The arm 34 turns about a pin 36 which is inserted in a hole in the arm and through a lug 35 mounted on the movable hinge bracket 21. A set screw 37 is mounted in the arm 34 at the end opposite from that moving in the die 27. In the disengaged or up position of the apparatus the set screw 37 contacts an angle 38 which is mounted on a supporting member 39 which is mounted on the base 10 as shown in Fig. 4, such contact being for the purpose of operating the ejector.

For moving the structure 22 about the hinge-pins 20 there is provided a U-shaped tubular handle 40 with ends mounted on the structure 22. To facilitate movement of the structure 22 a weight 41 is mounted on a bracket 42 by a bolt 43, said bracket 42 being mounted on the structure 22. The weight 41 is disposed at a position such that it will counter-balance the elements mounted on the structure 22. A protecting heat-insulating plate 44 is mounted on the structure 22 by a bracket 45 and disposed between the handle 40 and the dies 27 to serve as a shield.

Figure 2:
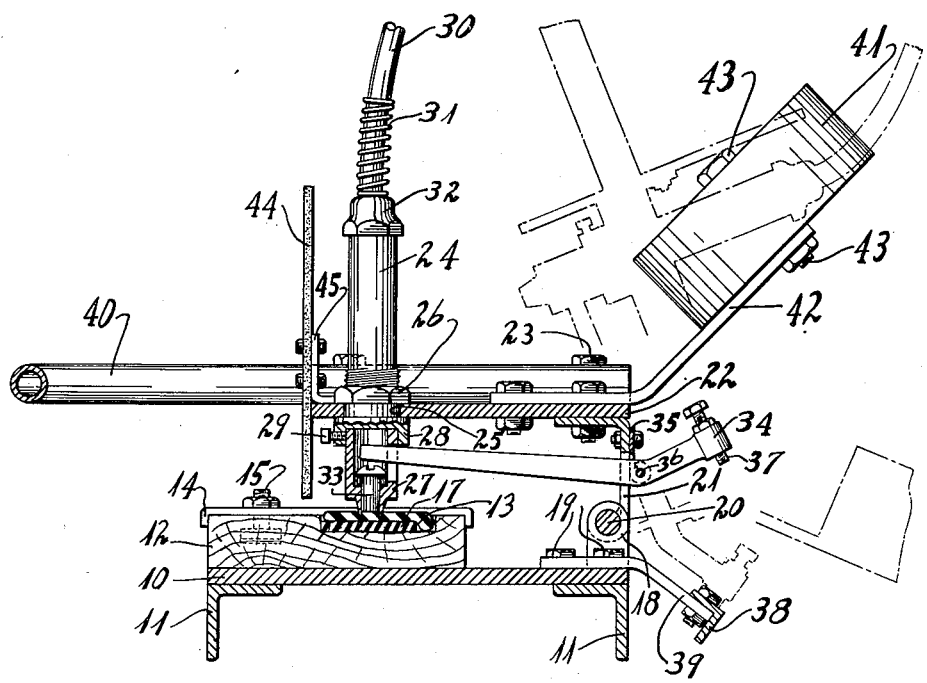
Fig. 2 is an enlarged cross-sectional view of the apparatus taken along line 2—2 of Fig. 1.

In operation, assuming the parts to be in the position as shown in full lines in Fig. 2, the material 13 rests on the formed support 12 and on the backing strip 17 and between the guides 14. The conduits 30 are connected to a source of electricity for heating the dies 27. The handle 40 is in the down or engaged position in which the dies 27 perforate the material 13 by a heat-softening and dieing action. The dies 27 pass through the material 13 and penetrate the backing strip 17, forcing the waste material as slugs into the dies 27.

Lifting of the handle 40 to bring the parts to the broken-line position of Fig. 2 disengages the dies 27 from the material 13, and the plungers 33 in the dies 27 force the slugs out of the dies 27. The plungers 33 are actuated by the arms 34 which are moved about the pins 36 by the action of the angle 38 on the set screws 37 as shown in Fig. 4. The set screws 37 make possible adjustments to the ejecting apparatus. Adjustment and removal of the dies 27 may be accomplished by adjustments of the set screws 29 mounted in the collar 28. Different type dies may be substituted including the male and female type where the female die may be mounted in the support 12 in place of the backing strip 17 and the ejecting apparatus dispensed with. In using the dies 26 with the backing strip 17 illustrated in the drawings, it is desirable that the strip 17 be of a leathery material such as leather, plasticized polyvinyl chloride or gasket material. Plasticized polyvinyl chloride is advantageous as it has resilience and may be sealed by the heat of the die 27 when it leaves the material. It is desirable that the weights 41 which counterbalance the movable parts of the apparatus effect a balance in which the apparatus will assume the open position in a state of rest. This is desirable because it will leave the support 12 free for removal and replacement of the material 13.

The construction of the apparatus described hereinbefore is such that the piece of stretchable material 13 may be perforated at a plurality of determinately spaced-apart positions along the same. The perforations may be made simultaneously, cleanly, and with a minimum of distortion of the piece 13. These characteristics of the apparatus are desirable as they facilitate the alignment of the material 13 in the desired condition of the material with other members which is an important factor in mass production of automobiles, refrigerators and other allied products.

Variations may be made without departing from the invention as it is defined in the following claims.

I claim:

1. Apparatus for perforating a piece of rubber or the like stretchable material at a plurality of determinately spaced-apart positions along the piece, said apparatus comprising a support, a rest mounted on said support and having a supporting surface substantially conforming to a face of the piece of material to be perforated, guides adjustably mounted on said rest for positioning the material, a cushion mounted on the supporting surface of said rest, a structure pivotally mounted on said support for relative movement thereto, means for counter-balancing said structure, perforating members mounted on said structure, said perforating members comprising die mounts and detachable open-end dies mounted in said mounts, electrical means for heating said dies, means for moving said structure to press said dies against the piece of material on said rest to cause penetration of the material and partial penetration of said cushion and injection of the slugs into the dies, an insulating shield disposed between said dies and the moving means, means for ejecting the slugs from said dies, said ejecting means comprising elements slidably mounted in said dies, and means connecting said elements and said supports and mounted for swinging movement on said structure in response to relative movement of said support and said structure for advancing said elements to eject the slugs from said dies.

2. Apparatus for perforating a piece of rubber or the like stretchable material at a plurality of determinately spaced-apart positions along the piece, said apparatus comprising a support, a rest mounted on said support and having a supporting surface substantially conforming to a face of the piece of material to be perforated, guides adjustably mounted on said rest for positioning the material, a cushion mounted on the supporting surface of said rest, a structure pivotally mounted on said support for relative movement thereto, means for counter-balancing said structure, perforating members mounted on said structure, said perforating members comprising die mounts and detachable open-end dies mounted in said mounts, electrical means for heating said dies, means for moving said structure to press said dies against the piece of material on said rest to cause penetration of the material and partial penetration of said cushion and injection of the slugs into the dies, means for ejecting the slugs from said dies, said ejecting means comprising elements slidably mounted in said dies, and means connecting said elements and said support and mounted for swinging movement on said structure in response to relative movement of said support and said structure for advancing said elements to eject the slugs from said dies.

PAUL L. KLINE.

REFERENCES CITED

The following references are of record in the file of this patent:

UNITED STATES PATENTS

| Number | Name | Date |
| --- | --- | --- |
| 412,802 | Simoulin | Oct. 15, 1889 |
| 490,824 | Hille | Jan. 31, 1893 |
| 1,016,120 | Ainsworth | Jan. 20, 1912 |
| 1,208,019 | Roney | Dec. 12, 1916 |
| 1,615,623 | Griffiths et al. | Jan. 25, 1927 |
| 1,736,958 | Whitecar | Nov. 26, 1929 |
| 1,907,757 | Drucker | May 9, 1933 |
| 2,065,033 | Stevens | Dec. 22, 1936 |
| 2,200,730 | Smallwood et al. | May 14, 1940 |
| 2,251,135 | Iknayan et al. | July 29, 1941 |
| 2,264,474 | Lang | Dec. 2, 1941 |
| 2,281,877 | Green | May 5, 1942 |